United States Patent
Hatazawa et al.

(10) Patent No.: US 6,428,934 B1
(45) Date of Patent: Aug. 6, 2002

(54) NON-AQUEOUS ELECTROLYTE BATTERY

(75) Inventors: Tsuyonobu Hatazawa; Kiyomitsu Matsune; Masami Miyake, all of Miyagi; Takashi Ono, Fukushima, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/448,587

(22) Filed: Nov. 24, 1999

(30) Foreign Application Priority Data

Nov. 30, 1998 (JP) .......................................... 10-340719

(51) Int. Cl.$^7$ .............................. H01M 2/02; H01M 2/14
(52) U.S. Cl. .................................... 429/231.95; 429/163
(58) Field of Search ........................... 429/231.95, 162, 429/163, 94

(56) References Cited

U.S. PATENT DOCUMENTS

| | | | | |
|---|---|---|---|---|
| 4,092,464 A | * | 5/1978 | Dey et al. | 429/127 |
| 4,925,751 A | * | 5/1990 | Shackle et al. | 429/191 |
| 4,997,732 A | * | 3/1991 | Austin et al. | 429/153 |
| 5,558,957 A | * | 9/1996 | Datta et al. | 429/127 |
| 5,670,272 A | | 9/1997 | Cheu et al. | 429/162 |
| 6,083,640 A | * | 7/2000 | Lee et al. | 429/94 |
| 6,106,973 A | * | 8/2000 | Sonozaki et al. | 429/162 |

FOREIGN PATENT DOCUMENTS

| | | |
|---|---|---|
| EP | 0390557 | 3/1990 |
| EP | 0834934 A1 | 4/1998 |
| JP | 60208049 | 10/1985 |
| JP | 62-61268 | 3/1987 |
| JP | 62061268 | 3/1987 |
| JP | 01248480 | 4/1989 |
| JP | 02021557 | 1/1990 |
| JP | 2-21557 | 2/1990 |
| JP | 09259897 | 3/1996 |
| JP | 09120812 | 5/1997 |
| JP | 9-259897 | 10/1997 |

* cited by examiner

*Primary Examiner*—Gabrielle Brouillette
*Assistant Examiner*—M Wills
(74) *Attorney, Agent, or Firm*—Sonnenschein, Nath & Rosenthal

(57) ABSTRACT

A nonaqueous electrolyte battery is disclosed which is capable of improving impact resistance while airtightness of a laminate film is being maintained. When a battery element is accommodated in a casing constituted by a laminate film and the case is welded to enclose the battery element, a resin layer is provided for at least one surface of a battery element. The resin layer may be a resin plate which has previously been molded or the resin layer may be formed by enclosing resin. The resin layer is provided for two sides of all of the sides of the battery element which have smallest areas. In a case of a wound-type battery element, the resin layer is provided for the two end surfaces of the wound battery element. The resin layer has a shock buffering function to protect the battery element from impact.

20 Claims, 4 Drawing Sheets

NON-AQUEOUS ELECTROLYTE BATTERY

RELATED APPLICATION DATA

The present application claims priority to Japanese Application No. P10-340719 filed Nov. 30, 1998 which application is incorporated herein by reference to the extent permitted by law.

BACKGROUND OF THE INVENTION

1. Field of the Invention

The present invention relates to a non-aqueous electrolyte battery having a structure that a battery element is accommodated in a casing constituted by a laminate film. More particularly, the present invention relates to improvement in impact resistance of the non-aqueous electrolyte battery.

2. Description of the Related Art

In recent years, a multiplicity of portable electronic apparatuses including camcorders, portable telephones and portable computers have come on the market. An attempt has been made to reduce the size and weight of the foregoing electronic apparatuses. As the portable power sources for the foregoing electronic apparatuses, batteries, in particular, secondary batteries, and more particularly, nonaqueous-electrolyte secondary batteries (so-called "lithium ion batteries") have energetically be researched and developed to reduce the thickness of the battery and realize a foldable structure.

As the electrolyte for the shape-variable battery, solidified electrolytic solution has energetically been studied. In particular, attention is being given to a polymer solid electrolyte into which lithium salt is dissolved in a gel electrolyte, which is a solid electrolyte containing a plasticizer, or a polymer.

On the other hand, the merits of the foregoing battery, which are small thickness and light weight, are attempted to be used. Therefore, a variety of batteries have been studied which have an encapsulating structure which uses a plastic film or a laminate film constituted by bonding a plastic film and a metal sheet to each other.

The conventional battery incorporating the sealed casing made of metal exhibits a merit that the casing has great rigidity. Therefore, the casing of the battery is not easily deformed. Thus, the electrode elements in the battery can satisfactorily be protected from damage. On the other hand, the so-called laminate film suffers from unsatisfactory rigidity. As a result, resistance against external impact is unsatisfactory. Therefore, if the battery is dropped, the electrode element in the battery is susceptible to damage. Thus, there arises a problem in that short circuit easily occurs between the positive electrode and the negative electrode.

SUMMARY OF THE INVENTION

In view of the foregoing, an object of the present invention is to provide a nonaqueous electrolyte battery which is capable of satisfactorily protecting an electrode element therein against external impact and which is enclosed in a laminate film.

To achieve the above-mentioned object, there is provided a non-aqueous electrolyte battery comprising: a casing constituted by a laminate film; and a battery element accommodated in the casing and enclosed by welding, wherein a resin layer is formed on one or more surfaces of the battery element so that the battery element and the casing are isolated from each other.

The non-aqueous electrolyte battery having the above-mentioned structure is able to protect the battery element from external impact owing to the impact buffering function of the resin layer. Therefore, if impact is exerted on the battery in a case of dropping or the like, satisfactory reliability can be realized.

Other objects, features and advantages of the invention will be evident from the following detailed description of the preferred embodiments described in conjunction with the attached drawings.

DESCRIPTION OF THE PREFERRED EMBODIMENTS

The structure of a nonaqueous electrolyte battery according to the present invention will now be described with reference to the drawings.

Figure 1:
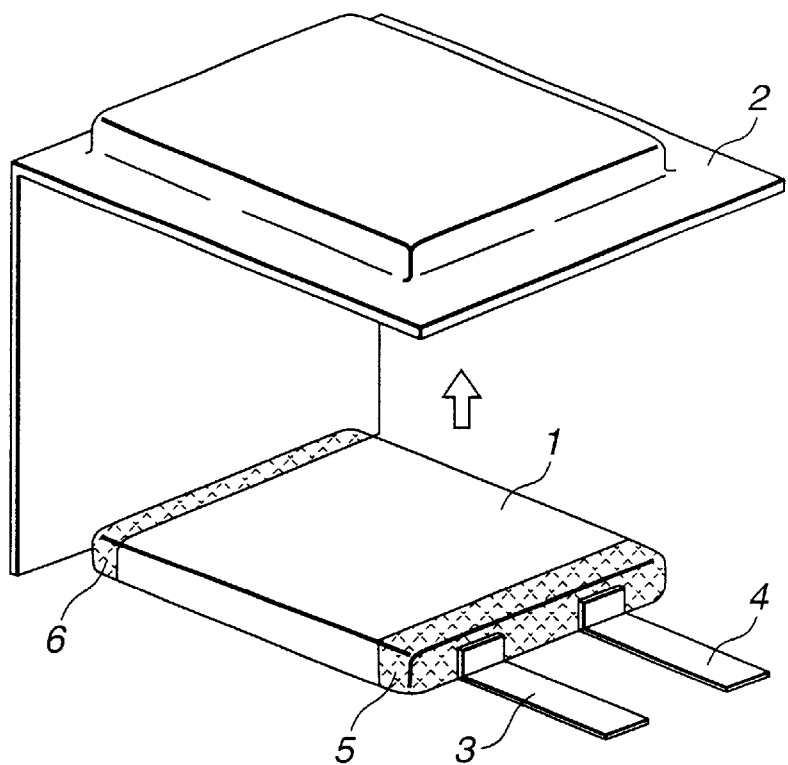
FIG. 1 is an exploded perspective view showing an example of the structure of a non-aqueous electrolyte battery according to the present invention.
Figure 2:
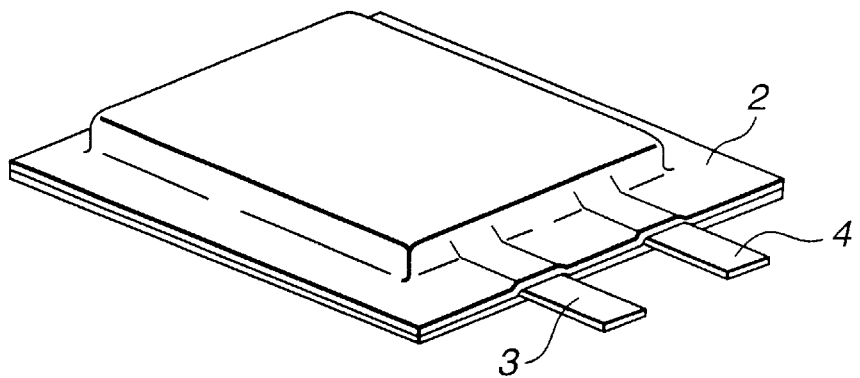
FIG. 2 is a schematic perspective view showing an example of the structure of the non-aqueous electrolyte battery according to the present invention.

The nonaqueous electrolyte battery according to the present invention is, for example, a solid electrolyte battery or a gel electrolyte battery. As shown in FIGS. 1 and 2, a battery element 1 having a structure that a solid electrolyte or a gel electrolyte is placed between a positive-electrode active-material layer and a negative-electrode active-material layer is accommodated in a casing 2, for example, a laminate film. The periphery of the laminate film is welded so that the battery element 1 is enclosed.

The battery element 1 is provided with a negative-electrode-terminal lead 3 which is electrically connected to a negative-electrode and a positive-electrode-terminal lead 4 which is electrically connected to a positive electrode. The negative-electrode-terminal lead 3 and the positive-electrode-terminal lead 4 are extracted to the outside portion of the casing 2.

The non-aqueous electrolyte battery according to the present invention has a structure that one or more surface between the battery element 1 and the laminate film (the casing 2) is provided with a resin layer. In this embodiment, resin layers 5 and 6 are disposed on the end surfaces of the wound battery element 1. Thus, the battery element 1 and the casing 2 constituted by the laminate film are separated from each other. The resin layers 5 and 6, each having an impact buffering function, protect the accommodated battery element 1 from external impact.

Figure 3:
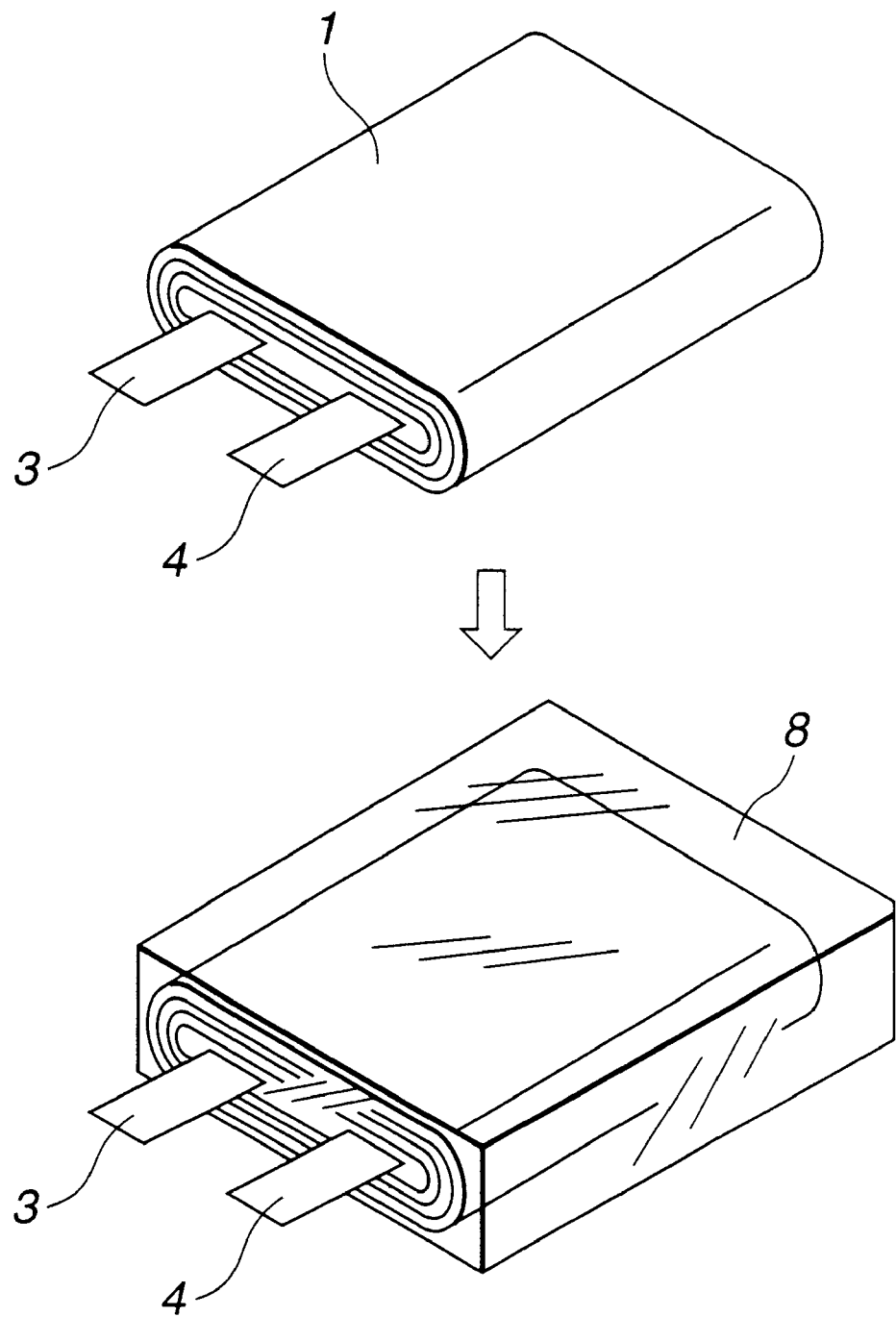
FIG. 3 is a schematic perspective view showing a state in which the overall surface of the battery element is covered with resin.
Figure 4:
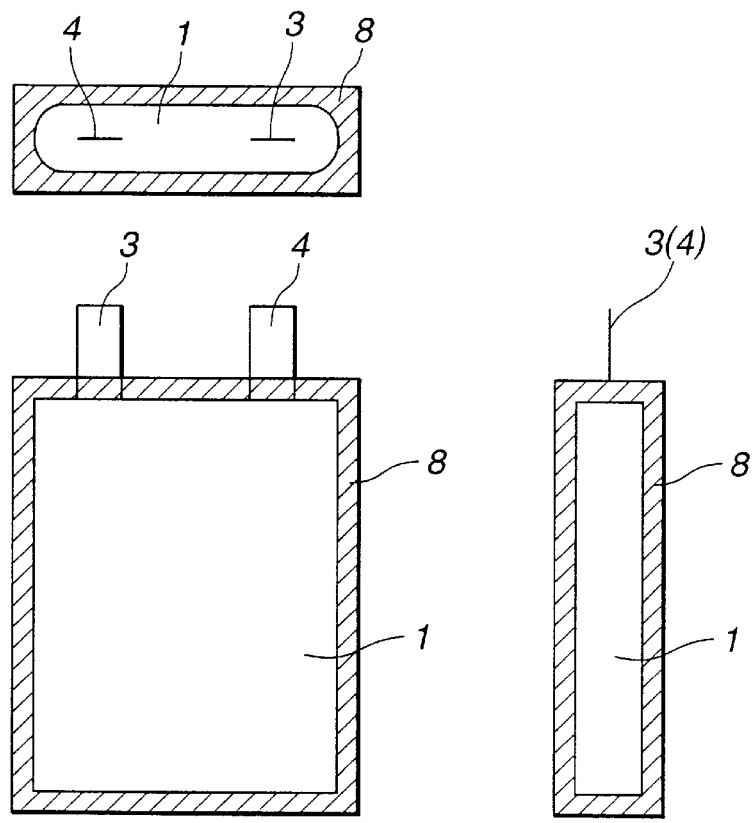
FIG. 4 is a trihedral view showing a volume loss portion realized when the overall surface of the battery element is covered with the resin.

If the overall surface of the battery element 1 is protected by a resin layer 8 as shown in FIG. 3, the foregoing object can easily be achieved. If the overall surface is covered as described above, the diagonal-line region shown in FIG. 4 becomes a volume loss. Thus, a ratio except for the battery element 1 in the battery case having a limited capacity is undesirably raised. As a result, the volume energy efficiency of the battery undesirably deteriorates.

Greatest impact is not exerted on the plane of the battery in a case of dropping or the like, that is, on the point of the battery in a case where the corner of the battery is dropped first. To effectively prevent the foregoing fact, it is preferable that the resin is disposed in a limited place, that is, a surface among the surfaces of the battery element 1 having the smallest area.

A battery of a type according to the present invention and having a structure that a flat battery is packed in a laminate film is sealed while the inside pressure is being lowered in order to remove moisture and improve the airtightness. At this time, stress which is exerted on the laminate film is concentrated to the corners of the battery. Therefore, the corners of the battery element has a poor durability against impact exerted from outside in a case of, for example, dropping. Therefore, the durability of the battery can be improved if the corners are reliably protected.

If determination is made that the shortest dimension among the dimensions of the battery is the thickness, it is an important fact that the thickness is reduced. If the thickness of a battery having a thickness of 3 mm is reduced by 100 $\mu$m, the volume efficiency deteriorates by 3%. If the thickness of a battery having a thickness of 0.5 mm is reduced by 100 $\mu$m, the volume efficiency deteriorates by 20%. Therefore, the structure of the present invention in which the resin layer is formed between the battery element and the laminate film enables the accommodated battery to be protected from external impact owing to the impact buffering function of the resin layer while deterioration in the volume energy efficiency is being minimized.

Figure 5:
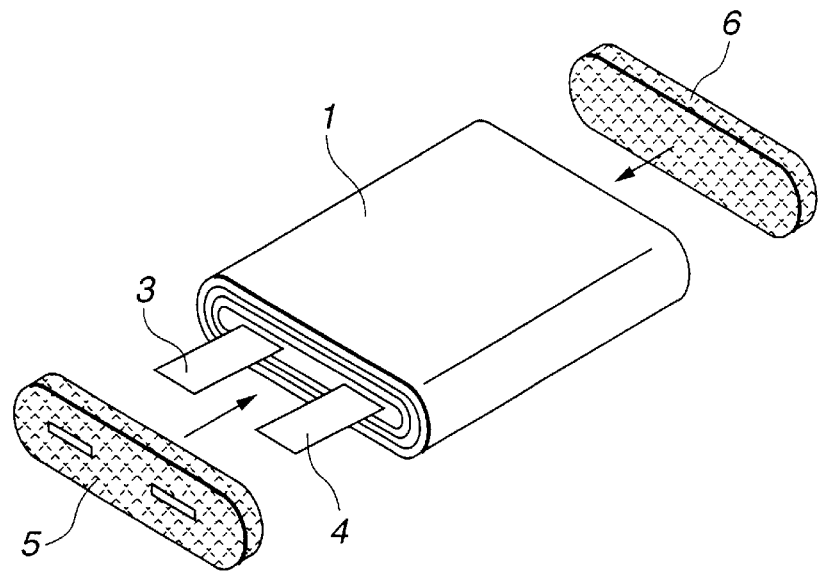
FIG. 5 is a schematic perspective view showing a state in which a resin plate, which is previously molded, is joined as a resin layer.
Figure 6:
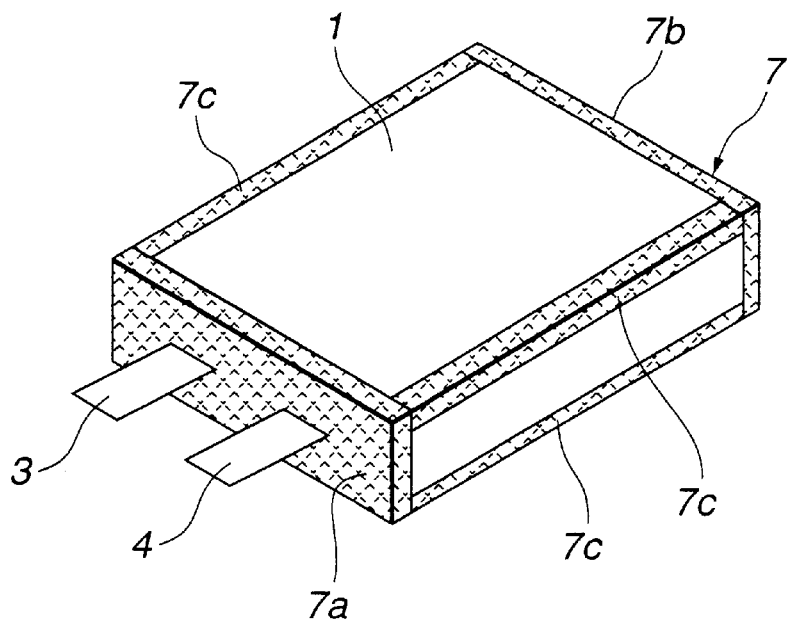
FIG. 6 is a schematic perspective view showing a state in which the resin layer is formed by enclosing the resin.

When the resin layers are provided, a method may be employed with which the battery element 1 is enclosed in the laminate film while resin layers 5 and 6 which have previously been molded and which are constituted by thin resin plates are being inserted, as shown in FIG. 5. Another method may be employed which has the steps of applying curing resin to the battery element; curing the resin; and enclosing the battery element into a laminate film. If a laminate film of a type having a space for accommodating a battery therein is employed, the battery element is accommodated in the space. Then, curing resin is enclosed, and then the resin is cured. Then, the laminate film is sealed. In the foregoing case, a resin layer 7 is formed in the periphery of the battery element 1, as shown in FIG. 6. The resin layer 7 is constituted by resin layers 7a and 7b which cover the two end surfaces of the battery element 1 and a resin layer 7c formed along the ridges of the battery element 1. Thus, impact resistance can furthermore be improved.

If the thickness of each of the resin layers 5, 6 and 7 is not larger than 50 $\mu$m, satisfactory impact resistance cannot be obtained. If the thickness is not smaller than 50 $\mu$m, the impact resistance can somewhat be improved. It is preferable that the thickness is 100 $\mu$m or larger to reliably obtain the foregoing effect and to facilitate the operation. It is preferable that the thickness is about 500 $\mu$m to obtain a required and satisfactory effect. If the thickness is 1 mm or larger, a great loss of the volume efficiency occurs.

The resin layer disposed between the battery element 1 and the laminate film may be made of at least one type of material selected from a group consisting of polyethylene, polypropylene, polyimide, polyamideimide, polyamide, polyphenylenesulfide, tetrafluoroethylene-perfluoroalkylvinylether copolymer, polyvinylidene fluoride, polytetrafluoroethylene, ethylene fluoride-polypropylene copolymer, ethylene-tetrafluoroethylene copolymer, polyvinyl fluoride, epoxy resin, acrylic resin, methacrylic resin, their mixture resin and crosslinked resin.

The crosslinked resin is exemplified by 2-hydroxyethyl (meta)acrylate, 2-hydroxypropyl (meta)acrylate, glycerol (meta)acrylate, 2-acrylamide-2-methylpropane sulfonate, sodium sulfonate ethyl (meta)acrylate, (meta)acrylamide, N,N-dimethylaminoethyl (meta)acrylate, N,N-diethylaminoethyl (meta)acrylate, N-isopropylacrylamide, N,N-dimethyl aminopropyl acrylamide, (meta)acrylate, (meta)sodium acrylate, 2-(meta)acryloyloxyethyl succinate, 2-(meta)acryloyl oxyethyl phthalate, 2-(meta)acryloyl oxyethyl hexahydrophthalate, $\omega$-carboxy-polycaprolactone monoacrylate, EO denatured phosphate (meta)acrylate, polyethylene glycol (meta)acrylate, acryloylmorpholine, p-styrenesulfonate, vinyl sulfonate, aryl sulfonate, (meta) acrylic acid ethyl sulfonate, (poly)ethylene glycol di (meta) acrylate (trade name of Shin-Nakamura: NK Ester A-200, A-400, A-600, A-1000, 4G, 9G, 14G or 23G, trade name of Kyoei: Light Ester 4EG, 9EG, 14EG, 9EG-A or 14EG-A), (poly)ethylene glycol mono (meta)acrylate (trade name of Shin-Nakamura: NK ester AMP-10G, AMP-20G, AMP-60G or AMP-90G, trade name of kyoei: Light Ester MC, 130MA or 041MA) ethoxy polypropylene glycoldimethacrylate (trade name of Shin Nakamura: NK Ester 1206PE). The foregoing material may be employed solely or a plurality of the materials may be combined with one another. As a curing means, heat, ultraviolet rays, visible rays, electron beams or radioactive rays.

An initiator which is employed when the ultraviolet-ray curing method is employed is exemplified by any one of the following materials which are activated owing to ultraviolet rays: sulfide, such as sodium methyldithiocarbamate sulfide, tetramethylthiuram monosulfide, diphenyl monosulfide or dibenzothiazoyl monosulfide; thioxanthone derivative, such as thioxanthone, ethylthioxanthone, 2-chlorothioxanthone, diethylthioxanthone or diisopropylthioxanthone; diazo compound, such as hydrazone, azoisobutylonitril or benzenediazonium; an aromatic carbonyl compound, such as benzoin, benzoin methylether, benzoin ethylether, benzoin isopropylether, benzophenone, dimethylaminobenzophenone, Michler's ketone, benzyl anthraquinone, t-butyl anthraquinone, 2-methyl anthraquinone, 2-methyl anthraquinone, 2-ethyl anthraquinone, 2-aminoanthraquinone, 2-chloro anthraquinone, benzylmethyl ketal or methylphenyl glyoxylate; acetophenone derivative, such as 1-hydroxy cyclohexylphenyl ketone, 2-hydroxy-2-methyl-1-phenylpropane-1-on, 4-(2-hydroxyethoxy)phenyl (2-hydroxy-2-propyl)ketone, 2,2-diethoxyacetophenone or 2,2-dimethoxyacetophenone; dialkylaminobutyl benzonate, such as 4-dimethylaminomethyl benzonate, 4-dimethylaminoethyl benzonate, 4-dimethylaminobutyl benzonate or 4-diethylaminoisopropyl benzonate; peroxide, such as benzoyl peroxide, di-t-butyl peroxide, dicumyl peroxide or cumene hydroperoxide; acridine derivative, such as 9-phenyl acridine, 9-p-methoxyphenyl acridine, 9-acetylaminoacridine or benzacridine; phenazine derivative, such as 9,10-dimethylbenzphenazine, 9-methylbenzphenazine or 10-methoxybenzphenazine; quinoxaline derivative, such as 4,4',4"-trimethoxy-2,3-diphenyl quinoxaline; 2,4,5-triphenyl imidazole dimer; haloganated ketone; and an acylated phosphorus compound, such as acylphosphine oxide or acylphosphonate. Note that the material is not limited to the foregoing materials.

A material which is activated owing to a visible ray and which is exemplified as follows may be employed: 2-nitrofluorene, 2,4,6-tris(trichloromethyl)-1,3,5-triazine, 3,3'-carbonyl biscoumalin and thio Michler's ketone.

The foregoing material may be employed solely or two or more types of the materials may be mixed with one another.

If the quantity to be blended is too small, a satisfactory reaction characteristic cannot be realized, the crosslinking point is lowered and plasctization easily takes place. If the quantity is too large, brittleness and decoloration easily occur. Therefore, it is preferable that the quantity is 0.01 part by weight to 20 parts by weight, more previously 0.1 part by weight to 5 parts by weight.

When an ultraviolet ray is employed as the activating light beam, the light source is an extra-high-pressure mercury lamp, a high-pressure mercury Lamp, a metal halide lamp, a xenone lamp or a low-pressure sterilizing lamp. The quantity of the ultraviolet rays to be applied varies depending on the type of the monomer and the amount of the light polymerization initiator. It is preferable that the quantity is 10 mJ/cm$^2$ to 10 J/cm$^2$. To prevent oxygen inhibition, irradiation with ultraviolet ray may be performed in an atmosphere of an inactive gas or in a state in which the atmosphere is intercepted by glass or a transparent plastic film.

In a case of the solid electrolyte battery or a gel electrolyte battery, the polymer material of the solid polymer electrolyte of the battery element 1 may be any one of the following materials: silicon gel, acrylic gel, acrylonitrile gel, polyphosphagen denatured polymer, polyethylene oxide, polypropylene oxide, their composite polymers, crosslinked polymers, denatured polymers or fluorine polymers which are exemplified by poly(vinylidene fluoride), poly(vinylidene fluoride-co-hexafluoropropylene), poly(vinylidene fluoride-co-tetrafluoroethylene), poly(vinylidene fluoride-co-trifluoroethylene) and their mixtures. As a matter of course, the material is not limited to this.

The solid electrolyte or the gel electrolyte laminated in the active material layer of the positive electrode or the active material layer of the negative electrode is obtained by causing the active material layer of the positive electrode or the active material layer of the negative electrode to be impregnated with solution composed of a polymer compound, an electrolyte salt and solvent (and a plasticizer in the case of the gel electrolyte). Then, the solvent is removed so that the solution is solidified. The active material layer of the positive electrode or the active material layer of the negative electrode is impregnated with a portion of the solid electrolyte or the gel electrolyte laminated in the active material layer of the positive electrode or the active material layer of the negative electrode so as to be solidified. In the case of the crosslinked material, light or heat is used to crosslink the material so as to be solidified.

The gel electrolyte is composed of a plasticizer containing a lithium salt and 2 wt % to 30 wt % matrix polymer. At this time, ester, ether or carbonate may be employed solely or as a component of the plasticizer.

When the gel electrolyte is prepared, a matrix polymer for gelling the carbonate may be any one of a variety of polymers for use to constitute the gel electrolyte. From a viewpoint of stability of oxidation and reduction, it is preferable that a fluorine polymer, such as poly(vinylidene fluoride) or poly(vinylidene fluoride-co-hexafluoropropylene), is employed.

The solid polymer electrolyte is composed of a lithium salt and a polymer compound for dissolving the lithium salt. The polymer compound may be ether polymer, such as poly(ethylene oxide) or its crosslinked material, poly(methacrylate) ester, acrylate material, fluorine polymer, such as poly(vinylidene fluoride) or poly(vinylidene fluoride-co-hexafluoropropylene). The material may solely be employed or their mixture may be employed. From a viewpoint of stability of oxidation and reduction, it is preferable that a fluorine polymer, such as poly(vinylidene fluoride) or poly(vinylidene fluoride-co-hexafluoropropylene), is employed.

The lithium salt which is contained in the gel electrolyte or the solid polymer electrolyte may be the lithium salt for use in a usual electrolytic solution for a battery. The lithium compound (salt) may be the following materials. Note that the present invention is not limited to the following materials.

The lithium compound (salt) is exemplified by lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis(trifluoromethanesulfonyl)imide lithium, $LiAsF_6$, $LiCF_3SO_3$, $LiC(SO_2CF_3)_3$, $LiAlCl_4$ and $LiSiF_6$.

The foregoing lithium compound may solely be employed or a plurality of the lithium compounds may be mixed. From a viewpoint of stability of oxidation, it is preferable that $LiPF_6$ or $LiBF_4$ is employed.

The concentration of the lithium salt which must be dissolved will now be described. In the case of the gel electrolyte, 0.1 mol to 3.0 mol may be dissolved in the plasticizer. It is preferable that the concentration is 0.5 mol/litter to 2.0 mol/litter.

The battery according to the present invention may have a structure of a conventional lithium-ion battery except for the structure that the gel electrolyte or the solid electrolyte is employed.

That is, the material of the negative electrode of a lithium-ion battery may be a material which permits doping/dedoping of lithium. The material for constituting the negative electrode, for example, may be non-graphitizing carbon or graphite. Specifically, any one of the following materials may be employed: pyrocarbon, cokes (pitch cokes, needle cokes or petroleum cokes), graphite, vitreous carbon, a sintered material of organic polymer compound (material obtained by baking phenol resin or furan resin at a proper temperature so as to be carbonized), carbon fiber and active carbon. As the material which permits doping/dedoping lithium, polymer, such as polyacetylene or polypyrrole, or an oxide, such as $SnO_2$, may be employed. When the negative electrode is constituted by the foregoing material, a known binder or the like may be added.

The positive electrode may be constituted by using metal oxide, metal sulphide or specific polymer as the active material of the positive electrode. When a lithium battery is constituted, the active material of the positive electrode may be metal sulphide or oxide, such as $TiS_2$, $MoS_2$, $NbSe_2$ or $V_2O_5$, which does not contain lithium, or lithium composite oxide mainly composed of $Li_xMo_2$ (where M is one or more types of transition metal, x varies depending on a state of charge/discharge and it is 0.05 or more and 1.10 or less). As the transition metal M which constitutes the lithium composite oxide, it is preferable that Co, Ni or Mn is employed. The lithium composite oxide is exemplified by $LiCoO_2$, $LiNiO_2$, $LiNi_yCo_{1-y}O_2$ (where 0<y<1) and $LiMn_2O_4$. The foregoing lithium composite oxide is an excellent active material of the positive electrode which is capable of generating high voltage and which exhibits a satisfactory energy density. The positive electrode may be constituted by combining a plurality of types of the foregoing active materials of the positive electrode. When the positive electrode is constituted by using the foregoing active material of the positive electrode, a known conductive material and a binder may be added.

The electrode terminals (the negative-electrode-terminal lead 3 and the positive-electrode-terminal lead 4) are joined to collectors of the corresponding positive electrode and the negative electrode. It is preferable that the material of the electrode terminals is an alloy, such as aluminum or titanium, which is not dissolved at a high potential. The negative electrode may be made of copper, nickel or their alloy.

The electrode terminals are bent to be flush with the main surface of the battery element 1 at the end of the wound battery element 1 from a viewpoint of improving the volume efficiency and easily extracting the electrode terminals. The resin layers 5, 6 and 7 are effective layers for preventing short circuit and also serving as shock absorbers.

The non-aqueous electrolyte battery according to the present invention may be a primary battery or a secondary battery. It is most preferable that the non-aqueous electrolyte battery is a lithium-ion secondary battery incorporating the solid electrolyte or the gel electrolyte.

EXAMPLES

Examples and comparative examples of the present invention will now be described in accordance with results of experiments.

Manufacturing of Sample Batteries

Initially, the negative electrode was manufactured as follows.

Powder of pulverized graphite in a quantity of 90 parts by weight and 10 parts by weight of poly(vinylidene fluoride-co-hexafluoropropylene) were mixed so that a mix for the negative electrode was prepared. Then, the foregoing mix was dispersed in N-methyl-2-pyrolidone so that slurry was prepared. The foregoing slurry was uniformly applied to either surface of an elongated copper foil which was a collector for the negative electrode and having a thickness of 10 $\mu$m. Then, the wet surface was dried, followed by compression-molding the elongated copper foil by a roll pressing machine. Thus, a negative electrode was manufactured.

On the other hand, the positive electrode was manufactured as follows.

To obtain an active material ($LiCoO_2$) for the positive electrode, lithium carbonate and cobalt carbonate were mixed at a molar ratio of 0.5:1, and then the mixed materials were baked at 900° C. for 5 hours in air. Then, 91 parts by weight of obtained $LiCoO_2$, 6 parts by weight of graphite serving as a conductive material and 10 parts by weight of poly(vinylidene fluoride-co-hexafluoropropylene) serving as the binder were mixed with one another. Thus, a mix for the positive electrode was prepared. Then, the mix was dispersed in N-methyl-2-pyrolidone so that slurry was prepared. The foregoing slurry was uniformly applied to either surface of an elongated aluminum foil which was a collector for the positive electrode and having a thickness of 20 $\mu$m. Then, the wet surface was dried, followed by compression-molding the elongated aluminum foil by a roll pressing machine. Thus, a positive electrode was manufactured.

Moreover, the gel electrolyte was obtained as follows.

The surface of each of the negative and positive electrodes was uniformly coated with solution prepared by mixing and dissolving 10 parts by weight of poly(vinylidene fluoride-co-hexafluoropropylene) having a weight average molecular weight of 600,000 and 60 parts by weight of diethyl carbonate in 30 parts by weight of plasticizer composed of 42.5 parts by weight of ethylene carbonate (EC), 42.5 parts by weight of propylene carbonate (PC) and 15 parts by weight of $LiPF_6$. Thus, the negative electrode and the positive electrode were impregnated with the solution, and then negative electrode and the positive electrode were allowed to stand at room temperature for 8 hours. Thus, dimethyl carbonate was vaporized and removed so that the gel electrolyte was obtained.

Figure 7:
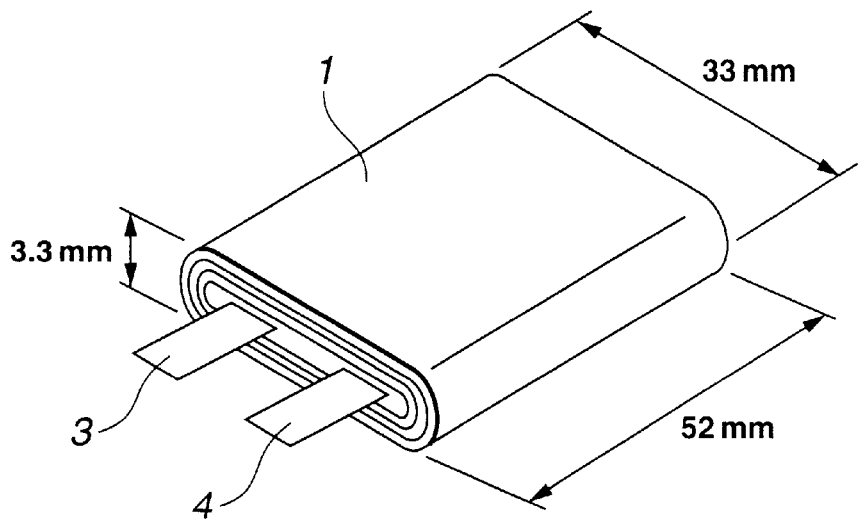
FIG. 7 is a schematic perspective view showing dimensions of the battery element according to the embodiment.

The gel electrolyte sides of the negative electrode and the positive electrode were joined and contact-bonded. Thus, 3.3 cm×5.2 cm×3.3 mm flat gel-electrolyte battery (capacity: 550 mAh) having a structure as shown in FIG. 7 was manufactured.

A positive-electrode-terminal lead made of aluminum and a negative-electrode-terminal lead made of nickel were welded to the surface of the portion of the pole plate on which the active material was not applied. Then, the manufactured structure was encapsulated in a pack constituted by a laminate film. A portion of the pack having a width of 5 mm was welded at 200° C. for 10 seconds by a sealing machine so that test batteries were manufactured.

Sample 1

A resin plate made of polypropylene and having a thickness of 300 $\mu$m was located as shown in FIG. 5, and the resin plate was packed as shown in FIGS. 1 and 2. Thus, a test battery was manufactured.

Sample 2

A resin plate made of polyimide and having a thickness of 300 $\mu$m was located as shown in FIG. 5, and the resin plate was packed as shown in FIGS. 1 and 2. Thus, a test battery was manufactured.

Sample 3

NK Ester 1206PE (trade name of Shin-Nakamura) in a quantity of 40 parts by weight, NK Ester 9G (trade name of Shin-Nakamura) in a quantity of 25 parts by weight and a curing material ("1173" which was a trade name of Ciba-Geigy Co., Ltd.) in a quantity of 0.5 part by weight were mixed, and then the mixed materials were deaerated to a vacuum. Thus, a curing resin composition was obtained.

The battery element was accommodated in a laminate film having a space for accommodating the battery in one side thereof. Then, the foregoing resin was enclosed in a clearance portion opposite to the surface adjacent to the electrode terminal and having a thickness of 300 $\mu$m. Then, the high-pressure mercury lamp was turned on to apply ultraviolet rays having energy of 20 $mJ/cm^2$ for one minute. Thus, a resin layer was formed between the battery element and the laminate film.

Sample 4

A process similar to that employed to manufacture Sample 1 was performed except for a resin plate made of polypropylene, having a thickness of 25 $\mu$m and employed in this process.

Sample 5

A battery was manufactured by packing only the battery electrode such that the resin layer was not enclosed.

EVALUATION

Each sample was initially charged/discharged at a five-hour ratio (1/5 C) of the theoretical capacity, and then each sample was charged/discharged at a two-hour ratio (1/2C) of the theoretical capacity. Thus, the capacity and average discharge voltage were measured. In accordance with the volume of a rectangular parallelopiped to which the battery element containing the resin layer was circumscribed, the volume energy density was calculated.

Each sample in a fully charged state was dropped 50 times from a position at a height of 2 m such that the corner of the battery was first reach the floor. Then, the OCV was counted so that occurrence of short circuit was evaluated (n=50).

Results were shown in Table 1.

TABLE 1

|  | Number of Short Circuits Took Place After Drop Test | Volume Energy Density (Wh/l) |
| --- | --- | --- |
| Sample 1 | 0/50 | 360.2 |
| Sample 2 | 0/50 | 360.2 |
| Sample 3 | 0/50 | 360.2 |
| Sample 4 | 5/50 | 364.0 |
| Sample 5 | 8/50 | 364.3 |

As can be understood from Table 1, Samples 1 to 3 each having the resin layer had a satisfactory volume energy density and excellent impact resistance. On the other hand, Sample 5 which was a comparative example resulted in unsatisfactory impact resistance and a significant difference in the rate of occurrence of short circuits. Also Sample 4 having the thin resin layer encountered occurrence of short circuit.

As can be understood from the description, the present invention is able to significantly improve the impact resistance while enclosure with excellent airtightness is being performed. Therefore, the non-aqueous electrolyte battery having satisfactory reliability can be provided if impact is exerted on the battery owing to dropping or the like.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte battery comprising:
a casing comprising a laminate film;
a battery element in said casing and enclosed by welding, said battery element comprising a plurality of surfaces characterized by surface areas, including at least one selected surface area that is less than a maximum surface area among the surface areas; and
a resin layer formed on at least one surface characterized by the selected surface area, and omitted on the surfaces characterized by the maximum surface area, so that said battery element and said casing are isolated from one another in at least one location.

2. A non-aqueous electrolyte battery according to claim 1, wherein said resin layer comprises a molded resin plate.

3. A non-aqueous electrolyte battery according to claim 1, wherein said resin layer is formed by enclosing resin in said casing.

4. A non-aqueous electrolyte battery according to claim 1, wherein said resin layer has a thickness between 50 μm and 1.0 mm.

5. A non-aqueous electrolyte battery according to claim 1, said battery element comprises a gel electrolyte or a solid electrolyte containing matrix polymer and lithium salt.

6. A non-aqueous electrolyte battery according to claim 1, wherein said battery element comprises a negative electrode containing a material which permits doping/dedoping lithium.

7. A non-aqueous electrolyte batter according to claim 6, wherein said material which permits doping/dedoping lithium is a carbon material.

8. A non-aqueous electrolyte battery according to claim 1, wherein said battery element comprises a positive electrode containing a composite oxide of lithium and a transition metal.

9. A non-aqueous battery according to claim 1, wherein said non-aqueous electrolyte battery is a secondary battery.

10. A non-aqueous electrolyte battery according to claim 1, wherein said selected surface area is a smallest surface area among the surface areas.

11. A battery comprising:
a casing;
a battery element in said casing, said battery element comprising a plurality of surfaces characterized by surface areas, including at least one selected surface area that is less than a maximum surface area among the surface areas; and
a resin layer formed on at least one surface characterized by the selected surface area, and omitted on the surfaces characterized by the maximum surface area, for isolating at least a portion of said battery element from said casing in at least one location.

12. A battery according to claim 11, wherein said resin layer has a thickness corresponding to a selected short circuit rate.

13. A battery according to claim 12, wherein the thickness is between 50 μm and 1.0 mm.

14. A battery according to claim 13, wherein the short circuit rate is less than 5 short circuits in 50 drops.

15. A battery according to claim 12, wherein the thickness is less than 50 μm.

16. A battery according to claim 11, wherein said selected surface area is a smallest surface area among the surface areas.

17. A battery according to claim 16, wherein said minimal surface area is an end-surface of said battery element where electrodes emerge from the casing.

18. A method of manufacturing a battery that includes a battery element comprising a plurality of surfaces characterized by surface areas, the method comprising:
selecting a surface of the battery element characterized by a surface area that is less than a maximum surface area among the surface areas;
providing a resin layer on the surface; and
enclosing said battery element in a casing, whereby said resin layer provides impact buffering in at least one location.

19. A method of manufacturing a battery according to claim 18, further comprising:
curing the resin layer; and
sealing the casing.

20. A method of manufacturing a battery according to claim 18, wherein selecting comprises selecting at least one end-surface of the battery element where electrodes emerge from the casing.

* * * * *